United States Patent [19]
Hendrickson et al.

(10) Patent No.: US 6,748,515 B1
(45) Date of Patent: Jun. 8, 2004

(54) PROGRAMMABLE VENDOR IDENTIFICATION CIRCUITRY AND ASSOCIATED METHOD

(75) Inventors: Alan F. Hendrickson, Austin, TX (US); Robert C. Wagner, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 619 days.

(21) Appl. No.: 09/617,350

(22) Filed: Jul. 17, 2000

(51) Int. Cl.⁷ .................................. G06F 15/00
(52) U.S. Cl. ........................ 712/32; 712/36; 712/37
(58) Field of Search ........................ 712/36, 35, 37, 712/32, 38; 713/2, 100; 710/10, 8, 62, 63; 379/399, 412

(56) References Cited

U.S. PATENT DOCUMENTS

| | | | |
|---|---|---|---|
| 5,794,032 A | | 8/1998 | Leyda |
| 5,870,046 A | | 2/1999 | Scott et al. |
| 6,021,447 A | * | 2/2000 | Szeto et al. ............... 710/8 |
| 6,073,016 A | | 6/2000 | Hulthen et al. |
| 6,091,806 A | * | 7/2000 | Rasmus et al. .......... 379/93.29 |
| 6,160,885 A | * | 12/2000 | Scott et al. ............ 379/399.01 |
| 6,167,472 A | * | 12/2000 | Mitra et al. ................ 710/65 |
| 6,192,420 B1 | | 2/2001 | Tsai et al. |
| 6,205,219 B1 | | 3/2001 | Hollenbach et al. |
| 6,263,075 B1 | | 7/2001 | Fadavi-Ardekani et al. |
| 6,298,006 B1 | * | 10/2001 | Reohr et al. ............... 365/236 |
| 6,359,973 B1 | * | 3/2002 | Rahamim et al. ........ 379/93.05 |
| 6,385,235 B1 | | 5/2002 | Scott et al. |
| 6,408,059 B1 | * | 6/2002 | Rasmus et al. .......... 379/93.29 |

OTHER PUBLICATIONS

Intel Corporation, "Audio Codec '97—Revision 2.1", May 22, 1998.

* cited by examiner

Primary Examiner—Henry W. H. Tsai
(74) Attorney, Agent, or Firm—O'Keefe, Egan & Peterman, LLP (57) ABSTRACT

An integrated circuit device and associated method are disclosed utilizing on-chip programmable circuitry that receives and stores vendor identification information, in particular, for devices meeting operational requirements of the Audio CODEC '97 Component Specification. The programmable circuitry allows for vendor ID information for multiple device configurations and/or multiple vendor supplied devices to be accurately reported to external devices. In particular, direct-access-arrangement (DAA) circuitry is disclosed having such on-chip programmable circuitry that may be loaded with vendor identification information at least in part from an external source. The external source may in turn be programmable circuitry, such as a EEPROM. This disclosed invention allows a single hardware DAA solution to be utilized by different software vendors, who each add their own respective software functionality, and to be utilized by a single software vendor, who desires to bundle different software functionality or revisions with the single hardware DAA solution. In this way, an integrated circuit may be designed and manufactured to provide a single hardware solution for a variety of different software or other programmable configurations.

42 Claims, 5 Drawing Sheets

PROGRAMMABLE VENDOR IDENTIFICATION CIRCUITRY AND ASSOCIATED METHOD

TECHNICAL FIELD OF THE INVENTION

The present invention relates to vendor identification information for electronic devices, and more particularly to vendor identification information for plug-and-play applications in computer systems meeting operational features of the Audio CODEC '97 Component Specification.

BACKGROUND

The Audio CODEC '97 Component Specification (AC97) is sponsored by Intel Corporation and provides a standard interface for computer system audio applications, including modem CODEC functionality. In part, the AC97 specification contemplates that devices will report their vendor information to the operating system for plug-and-play device driver installation, for example, with the Microsoft WINDOWS operating system. The AC97 specification provides two fixed addresses (namely, hex 7C and hex 7E) for vendors to report identifying codes to allow boot software to load drivers compatible with the given vendor identification codes.

One problem associated with this fixed vendor identification scheme, however, is that it does not provide a solution for a device supplied through multiple vendors or a device with multiple different configurations. For example, a single integrated circuit vendor may sell a hardware solution to multiple modem software vendors, or alternatively, a single modem vendor may sell one of several software revisions bundled with a single hardware revision. In such situations, it would be advantageous for the same piece of silicon to report different vendor identification information from the vendor identification registers. The AC97 specification, however, does not contemplate a solution to this problem.

SUMMARY OF THE INVENTION

In accordance with the present invention, programmable on-chip vendor identification circuitry and associated method are disclosed that provide a solution to this multiple vendor identification problem. An integrated circuit device includes programmable circuitry that receives and stores vendor identification information provided or selected at least in part from a source external to the integrated circuit, which may also be programmable circuitry, such as an EEPROM (Electrically Erasable Programmable Read Only Memory).

In one embodiment, the present invention is a direct-access-arrangement (DAA) circuitry, including a digital interface within an integrated circuit configured to communicate with an external host processor, and programmable circuitry within the integrated circuit. The programmable circuitry is coupled to the digital interface and is configured to receive and store vendor identification information provided at least in part from a source external to the integrated circuit. More particularly, the digital interface is configured to operate within AC97 operational specifications, and the external source for the identification information is programmable circuitry. In addition, the external programmable circuitry may be loaded with vendor identification information through the digital interface.

In another embodiment, the present invention is an integrated circuit device configured to operate within AC97 operational specifications, including a digital interface within an integrated circuit configured to operate within AC97 operational specifications, and programmable circuitry coupled to the digital interface. The programmable circuitry is configured to receive and store vendor identification information that is provided at least in part from a source external,, to the integrated circuit. In more detailed embodiments, the programmable circuitry includes multiple registers that each store vendor identification information. In addition, the programmable circuitry may receive fixed vendor identification information from a source internal to the integrated circuit and may receive programmable vendor identification information from a source external to the integrated circuit.

In yet another embodiment, the present invention is a computer system having direct-access-arrangement (DAA) circuitry configured to couple the computer system to telephone lines, including a processor, a digital controller coupled to the processor and configured to operate within AC97 operational specifications, digital-access-arrangement (DAA) circuitry including at least one integrated circuit, and programmable circuitry included within the integrated circuit. The DAA circuitry is coupled to the digital controller and is configured to operate within AC97 operational specifications. The programmable circuitry is configured to receive and store vendor identification information provided at least in part from a source external to the integrated circuit. More particularly, the programmable circuitry includes multiple registers, with each register being capable of storing vendor identification information. Still further, the multiple registers may include a first register and a second register that each store first vendor identification information and a third register and a fourth register that each store second vendor identification information. Also, the external source for the identification information may be programmable circuitry.

In a further embodiment, the present invention is a computer system including circuitry configured to operate within AC97 operational specifications, including a processor, a digital controller coupled to the processor and configured to operate within AC97 operational specifications, an integrated circuit device configured to operate within AC97 operation specifications, and programmable circuitry included within the integrated circuit device, such that the programmable circuitry is configured to receive and store vendor identification information provided at least in part from a source external to the integrated circuit. More specifically, the external source for the identification information is programmable circuitry.

In another respect, the present invention is a method for providing vendor identification information for direct-access-arrangement (DAA) circuitry, including providing a DAA integrated circuit configured to communicate with a host processor, receiving vendor identification information to the DAA integrated circuit at least in part from a source external to the integrated circuit, and storing the vendor identification information in programmable circuitry within the DAA integrated circuit. More particularly, the DAA integrated circuit is configured to operate within AC97 operational specifications. In addition, the receiving step comprises receiving programmable identification information from external programmable circuitry. In another embodiment, the present invention is a method for providing vendor identification information for an integrated circuit device configured to operate within AC97 operational specifications, including providing an integrated, circuit device configured to operate within AC97 operational specifications, receiving vendor identification information to the integrated circuit device from a source external to the integrated circuit, and storing the vendor identification information in programmable circuitry within the integrated circuit device. More particularly, the receiving step includes receiving programmable identification information from external programmable circuitry. The storing step may include storing first vendor identification information in at least one first register and storing second vendor identification information in at least one second register. In addition, the receiving step may include receiving fixed vendor identification information from a source internal to the integrated circuit and receiving programmable vendor identification information from a source external to the integrated circuit.

DESCRIPTION OF THE DRAWINGS

It is noted that the appended drawings illustrate only exemplary embodiments, of the invention and are, therefore, not to be considered limiting of its scope, for the invention may admit to other equally effective embodiments.

DETAILED DESCRIPTION OF THE INVENTION

The present invention contemplates an integrated circuit device having on-chip programmable circuitry that may receive and store vendor identification information. By being programmable, the programmable circuitry allows for vendor ID information for multiple device configurations and/or multiple vendor supplied devices to be accurately reported to external devices. In particular, the present invention contemplates direct-access-arrangement (DAA) circuitry having on-chip programmable circuitry that may be loaded with vendor identification information at least in part from an external source. In addition, this external source may also be programmable, so that it may be loaded with desired vendor identification information. The present invention allows a single hardware DAA solution to be utilized by different software vendors, who each add their own respective software functionality, and to be utilized by a single software vendor, who desires to bundle different software functionality or revisions with the single hardware DAA solution. In this way, an integrated circuit may be designed and manufactured to provide a single hardware solution for a variety of different software or- other programmable configurations.

Figure 1:
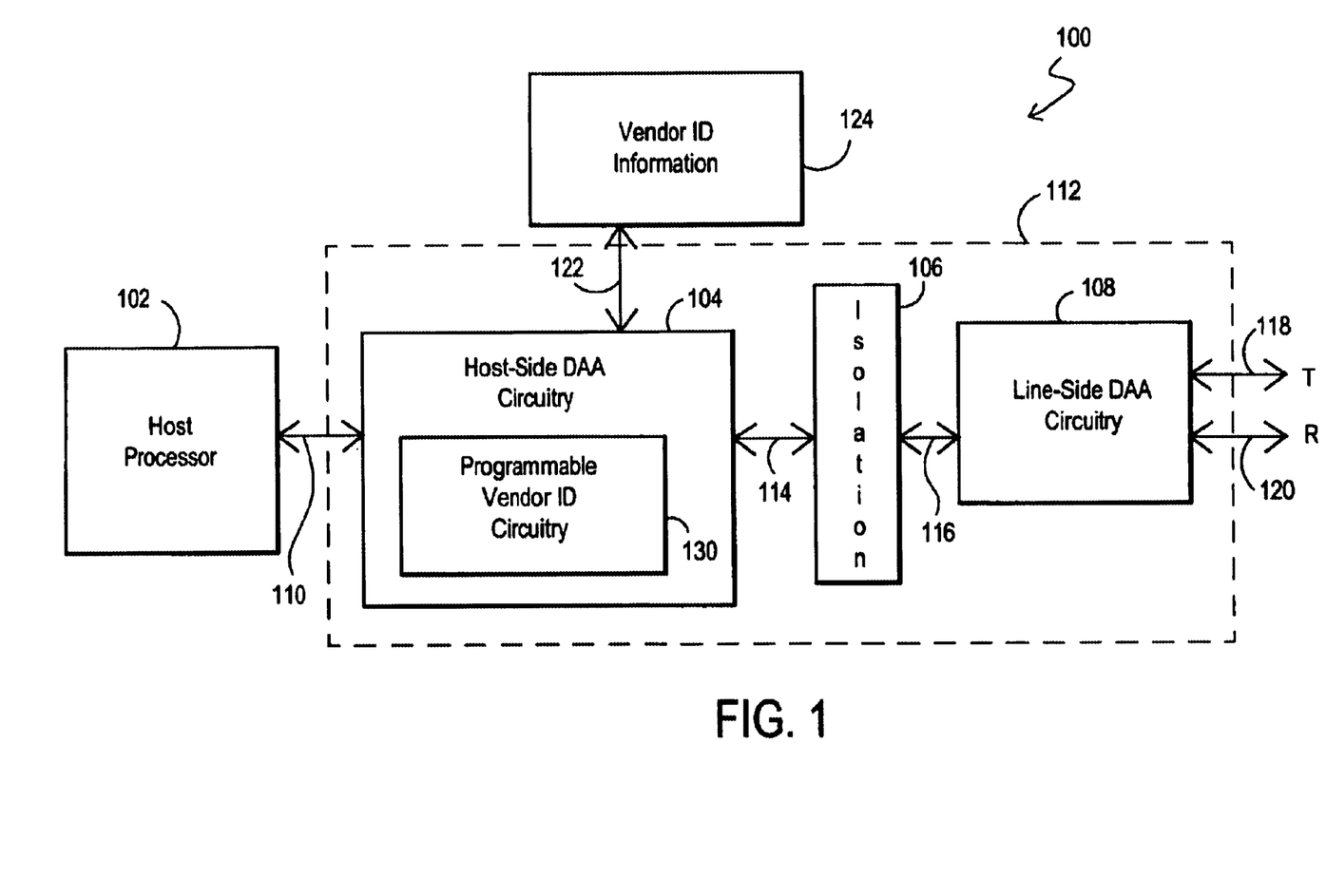
FIG. 1 is a block diagram of host-side and line-side direct-access-arrangement (DAA) circuitry including programmable on-chip vendor identification circuitry, according to the present invention.

FIG. 1 is a block diagram for an embodiment 100 according to the present invention including programmable on-chip vendor identification circuitry 130, according to the present invention.. A host processor 102 is coupled to direct-access-arrangement (DAA) circuitry 112 through an interface 110. The DAA circuitry 112 is configured to allow the host processor 102 to communicate with the tip (T) 118 and ring (R) 120 of a telephone line. The DAA circuitry 112 includes host-side DAA circuitry 104, an isolation barrier 106, line-side DAA circuitry 108, and isolation communication interfaces 114 and 116. The host-side DAA circuitry 104 and line-side DAA circuitry 108 may each include a single integrated circuit. An example of such DAA circuitry is described in U.S. Pat. No. 5,870,046, which is assigned to Silicon Laboratories, Inc. U.S. Pat. No. 5,870,046, as well as co-pending application Ser. No. 09/035,175 entitled "Direct Digital Access Arrangement Circuitry and Method for Connecting Phone Lines," also assigned to Silicon Laboratories, Inc., are hereby each incorporated by reference in its entirety.

In addition, each of the following U. S. patent applications, which are related in subject matter to the current application and are filed concurrently herewith, is hereby incorporated by reference in its entirety: Ser. No. 09/617,465, entitled "TELEPHONE RING-VALIDATION AND WAKE-ON-RING CIRCUITRY AND ASSOCIATED METHODS" by Alan F. Hendrickson; Ser. No. 09/617,757 (now issued as U.S. Pat. No. 6,510,215), entitled CALLER ID DATA-REPORTING MECHANISM FOR ELECTRONIC DEVICES AND ASSOCIATED METHODS" by Alan F. Hendrickson; Ser. No. 09/617,079, entitled "TELEPHONE HANG-UP TIMEOUT CIRCUITRY AND DATA TIMEOUT CIRCUITRY FOR ELECTRONIC DEVICES AND ASSOCIATED METHODS" by Alan F. Hendrickson; and Ser. No. 09/617,405, entitled "DATA-SECURITY CIRCUITRY FOR ELECTRONIC DEVICES AND ASSOCIATED METHODS" by Alan F. Hendrickson.

According to the present invention, the DAA circuitry 112 includes programmable on-chip vendor identification circuitry 130 within an integrated circuit portion of host-side DAA circuitry 104. The programmable circuitry 130 may be loaded with vendor identification information 124 through interface 122, so that the programmable circuitry 130 stores vendor identification information provided at least in part from a source external to the integrated circuit portion of host-side DAA circuitry 104. This configuration allows for the integrated,circuit portion of the host-side DAA circuitry to be a single hardware solution for multiple vendors or multiple configurations from a single vendor. Thus, when the DAA circuitry 112 reports vendor information to the host processor 102, for example, when device drivers are required to be installed in a plug-and-play operating system environment, the proper vendor ID information may be provided even though there are a number of configurations for the hardware and software that provides the functionality of the DAA circuitry 112.

For example, a modem vendor utilizing the DAA circuitry 112 may make product distinctions through the software feature set and through hardware components. Thus, the modem vendor may utilize a single design for manufacture of a product, yet select different software feature sets through the vendor ID information 124. In this way, different products with different features and at different costs may be provided to customers without having to alter the basic product design. In addition, the modem vendor may utilize the vendor ID information 124 to allow for different hardware configurations. For example, a modem vendor may manufacture printed circuit boards that have multiple possible configurations that support integrated circuits mounted on the printed circuit boards. The vendor ID information 124 may be utilized to install a driver setting that matches the integrated circuit operation to the particular board configuration. Still further, as indicated above, the vendor ID information 124 may allow for particular drivers to be loaded for the modem product, for example, during a boot-up sequence for a personal computer.

Figure 2:
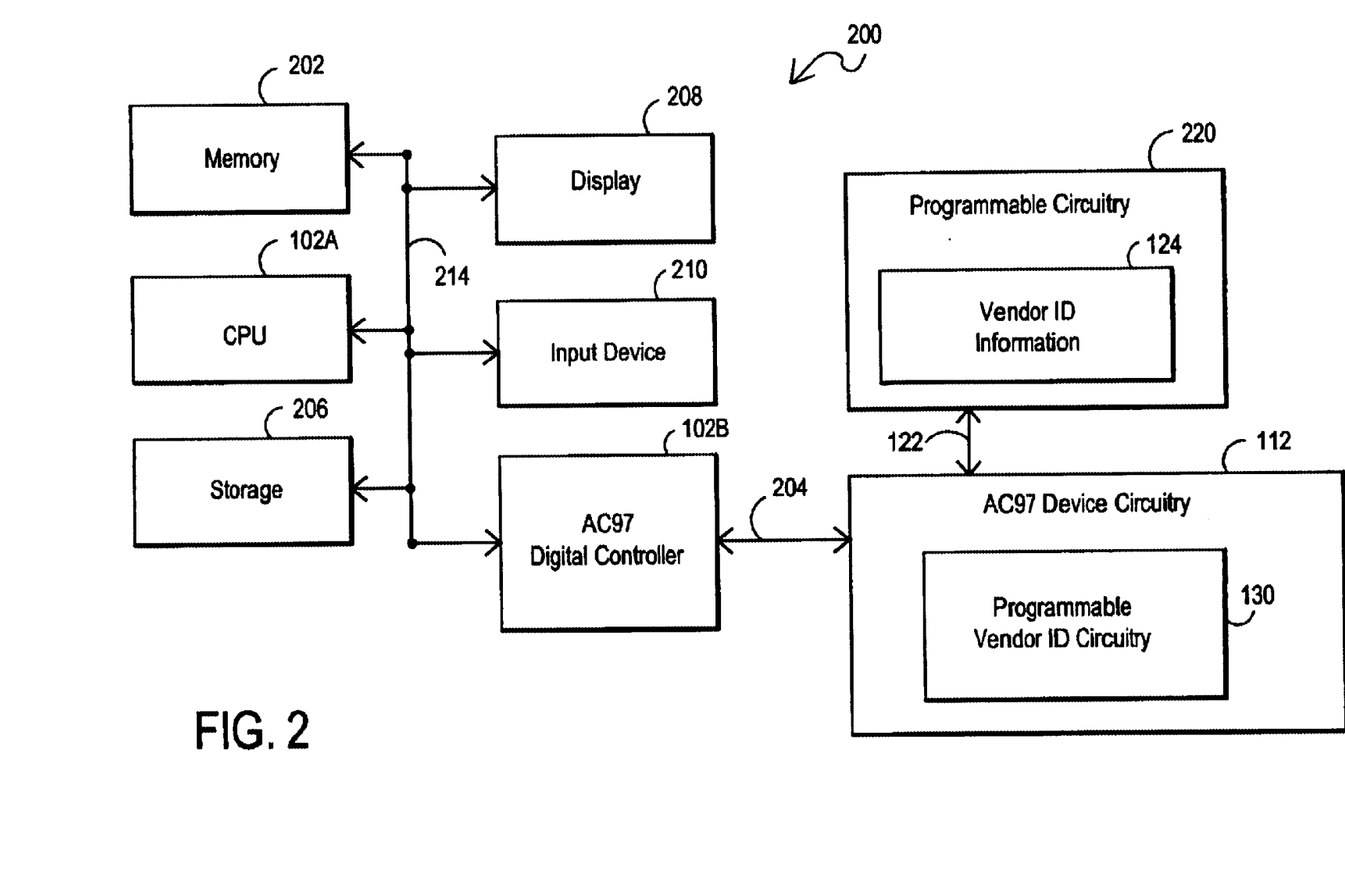
FIG. 2 is a block diagram of a computer system including AC97 device circuitry having a programmable on-chip vendor identification circuitry, according to the present invention..

It is noted that the vendor ID information 124 may be stored in programmable circuitry 220, as depicted in FIG. 2 (described in more detail below), that is external to the integrated circuit portion 104 of the DAA circuitry 112. The programmable nature of this circuitry tends to enhance the ease of configuration for a vendor utilizing the programmable vendor ID circuitry 130 of the DAA circuitry 112, according to the present invention. If desired, the programmable circuitry 220 may be programmed by the vendor through the DAA circuitry 112 to store the vendor ID information 124. Thus, once a vendor has the DAA circuitry 112 and the programmable circuitry 220, the vendor may utilize the communication interface for the DAA circuitry 112 to load the programmable circuitry with the desired vendor ID information 124. As discussed above, this vendor ID information 124 may provide for any of a wide variety of different software and/or hardware configurations. One embodiment for such programmable circuitry 220 is depicted with respect to FIG. 5. In particular for this embodiment 500, the programmable circuitry is an EEPROM (Electrically Erasable Programmable Read Only Memory).

It is noted that, if desired, the vendor identification information 124 may also include on-chip information, such as, for example, information in a configuration look-up table. This vendor identification information 124 may then be selected and loaded into the programmable circuitry 130 depending at least in part upon a control signal external to the integrated circuit on which the programmable circuitry 130 resides. In this way, vendor ID information for different software configurations may be selected from the vendor ID table through a simple programmed off-chip signal supplied to the integrated circuit. For example, a simple hard-wired 2-bit signal may be provided to the integrated circuit to choose between four different configurations. It is further noted that other techniques may also be employed to provide vendor ID information, including programmable vendor ID information, to on-chip programmable vendor ID circuitry, according to the present invention.

Figure 5:
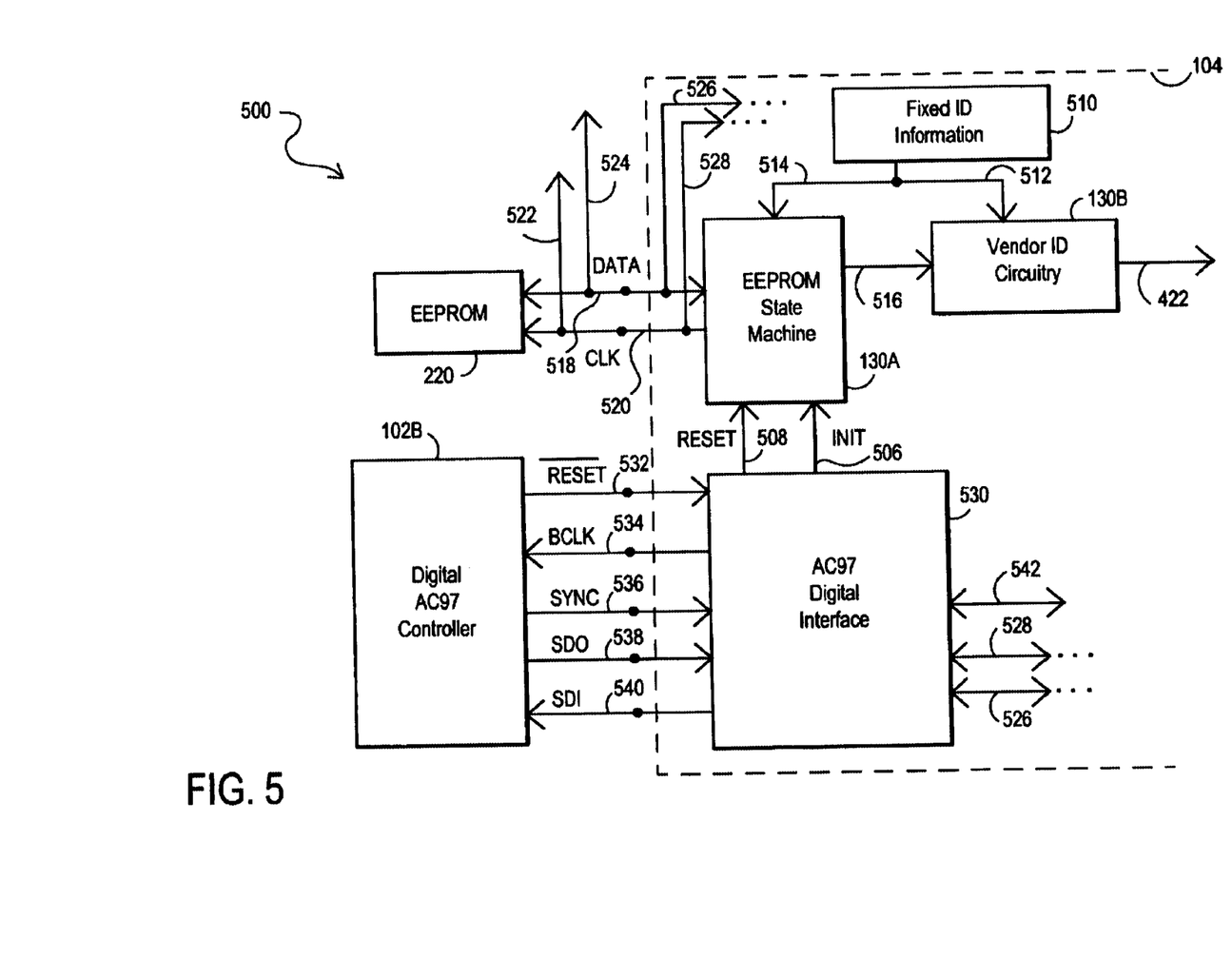
FIG. 5 is a block diagram of an embodiment utilizing a EEPROM to provide vendor identification information from off-chip, according to the present information.

As indicated above, the present invention is particularly useful where the host processor 102 is at least in part a digital controller configured to meet and operate within the AC97 controller operational specifications, and the DAA circuitry 112 is also configured to meet and operate within AC9 CODEC operational specifications, and more particularly, the modem CODEC specifications. The embodiment depicted with respect to FIG. 5 provides a more detailed embodiment directed to an AC97 application. It is noted that as used herein AC97 operational specifications are contemplated as including the current AC97 operational specifications and any revisions or updates to this specification, as well as any follow-on specifications that incorporate features of the current AC97 operational specification, including vendor identification features. The Audio CODEC '97 Component Specification (AC97), revision 2.1 (May 22, 1998) is hereby incorporated by reference in its entirety.

FIG. 2 is a block diagram of another embodiment, according to the present invention. In this embodiment, a computer system 200 is depicted that includes a central processing unit (CPU) 102A that may be coupled to various other devices through an interfaces or buses 214, as would be understood to one of skill in the art. For example, the CPU 102A may be coupled to a memory device 202, a storage device 206, a display device 208, an input device 210, and/or other devices. In addition, CPU 102A may be coupled to a digital controller 102B that is configured to meet AC97 operational specifications. It is noted that although the digital controller 102B is shown as a separate block in FIG. 2, the AC97 control functionality may be located anywhere desired, including on an integrated circuit that is also the CPU 102A. It is also noted that the CPU 102A and the AC97 digital controller 102B may together or individually be the host processor 102 in FIG. 1, as desired.

Referring again to FIG. 2, the digital controller 102B is coupled to device circuitry 112 through interface 204. It is noted that interface 204 may be a subset number of signal lines 440 122 going to the device circuitry 112. As with the digital controller 102B, the device circuitry 112 in FIG. 2 is configured to meet AC97 operation specifications. According to the present invention, the device circuitry 112 may include at least one integrated circuit that has programmable vendor identification circuitry 130. The programmable circuitry 130 may be loaded with vendor ID information 124 through interface 122, so that the programmable circuitry 130 stores vendor ID information 124 provided or selected at least in part from a source external to the integrated circuit portion of the AC97 device circuitry 112. As depicted in FIG. 2, programmable circuitry 220 stores the vendor ID information 124.

Figure 3:
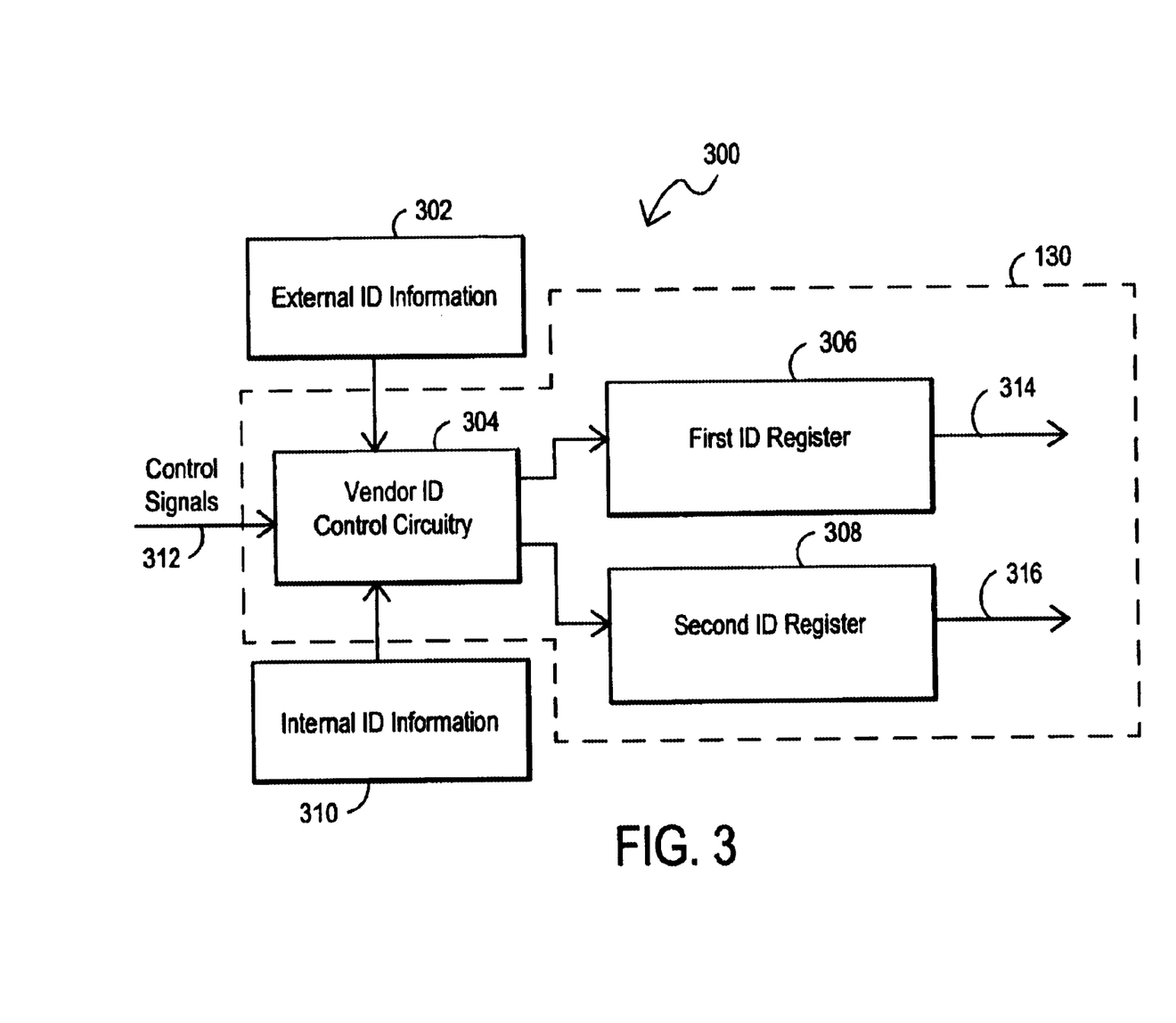
FIG. 3 is a block diagram of programmable registers that may be loaded with first or second vendor identification information, according to the present invention.

FIG. 3 is an embodiment 300 including programmable vendor identification circuitry 130, according to the present invention. In the embodiment 300 depicted, the programmable vendor identification (ID) circuitry 130 includes a first ID register 306 and a second ID register 308 that may be accessed and loaded with desired information. Vendor ID control circuitry 304 receives control signals 312 and the vendor ID information for loading into the first and second ID registers 306 and 308, which in turn provide output signals 314 and 316. The vendor identification sources 302 and 304 are intended to show that at least a portion of the vendor ID information may come from an ID information source 302 that is external to the integrated circuit. Also, a portion of the vendor ID information may come from an ID information source 310 that is internal to the integrated circuit. It is noted that although a first and a second ID registers 306 and 308 are depicted, any number of registers or other circuitry configured to receive and store identification information could be utilized, as desired by one implementing devices in accordance with the present invention.

Figure 4:
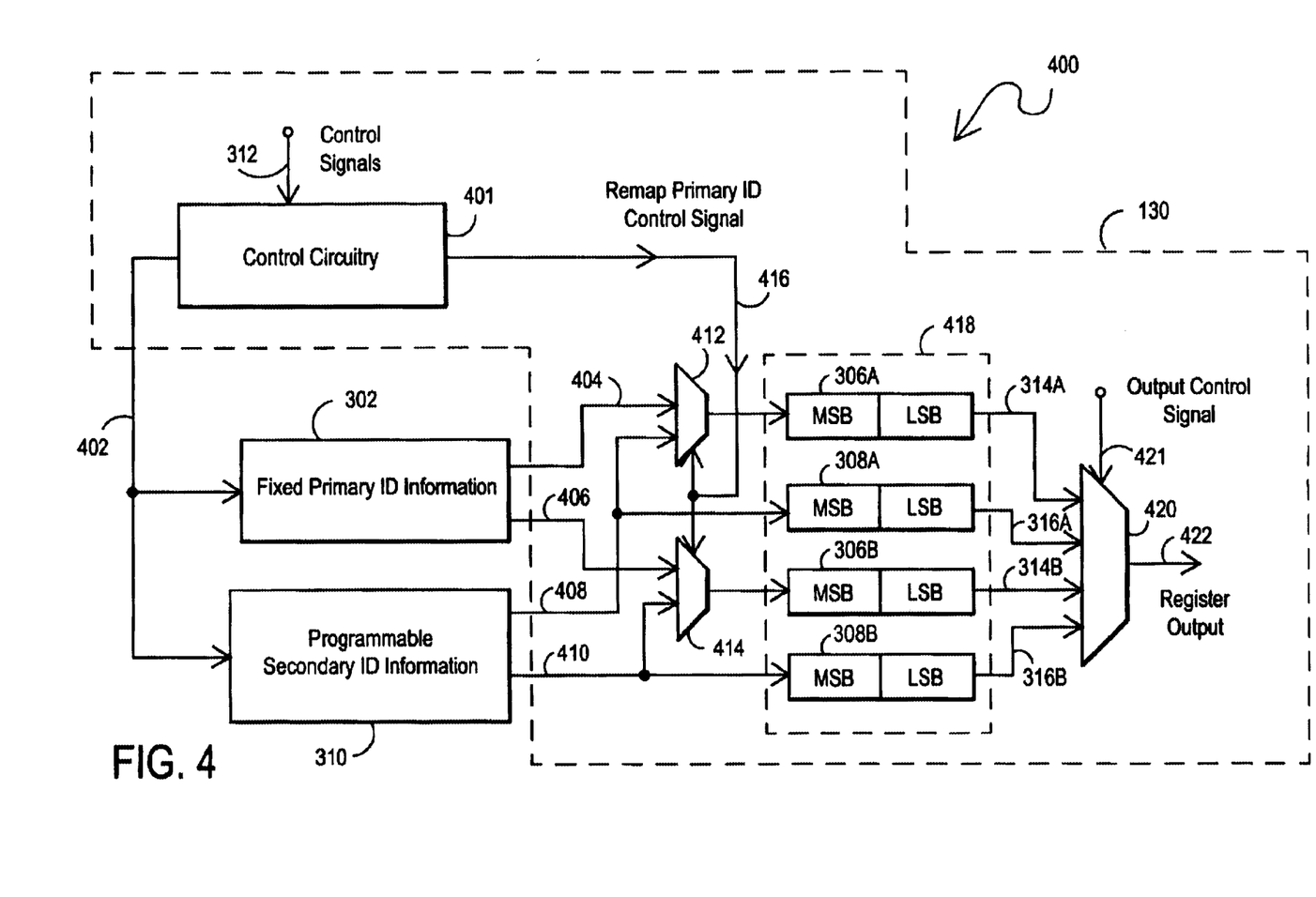
FIG. 4 is a block diagram of a more detailed embodiment having multiple registers that may be loaded with fixed primary vendor identification information and programmable secondary vendor identification information, according to the present invention.

Now referring to FIG. 4, a block diagram is provided for a more detailed embodiment 400, according to the present invention. In this embodiment, vendor ID information is provided from a fixed source 302, which provides predetermined ID information that cannot be programmed, and a programmable source 310, which provides ID information that may be modified or programmed. In addition, this embodiment contemplates primary vendor and secondary vendor information, such that the source 302 provides primary vendor ID information, and source 310 provides secondary vendor information. It is noted that the any desired number of levels (e.g., primary, secondary, etc.) or types of vendor information may be provided and that any combination of fixed and programmable source vendor identification information may be utilized, as long as there exists on-chip programmable vendor identification circuitry that may be loaded at least in part with vendor identification information, according to the present invention.

The embodiment for the programmable vendor ID circuitry 130 within FIG. 4 includes control circuitry 401 that receives control signals 312 and outputs various control signals, including signals 402 to the vendor identification sources 302 and 310 and the REMAP signal 416. The fixed primary ID information source 302 provides an output 404 to selection circuitry 412 and an output 406 to selection circuitry 414. The programmable secondary ID information source 310 provides an output 408 to the selection circuitry 412 and directly to register 308A within on-chip registers 418. The programmable secondary ID information source 310 also provides an output 410 to the selection circuitry 414 and directly to register 308B within on-chip registers 418. The output of selection circuitry 412 is provided to register 306A, and the output of selection circuitry 414 is provided to register 306B. The registers 306A, 306B, 308A, and 308B are coupled through output paths 314A, 314B, 316A, and 3166B, respectively, to selection circuitry 420. The selection circuitry 420 is controlled by output control signal 421 and provides the contents of the selected register as register output 422. The selection circuitry 412 and selection circuitry 414 are both controlled by the REMAP signal 416. It is noted that selection circuitry 412, 414 and 420 may be for example multiplexers that between multiple inputs based upon control signals.

It is noted that each of the registers 306A, 306B, 308A and 308B may be, for example, 16-bit registers, including two 8-bit bytes of information with one byte representing the most significant byte (MSB) and the other byte representing the least significant byte (LSB). In addition, the registers 306A, 306B, 308A and 308B may represent only a portion of the registers within on-chip registers 418. For example, in the AC97 specification, there are numerous predefined registers that are designated to hold various types of information. Two of these registers are designated to hold vendor identification information. In the AC97 specification, these two predefined registers are designated 7C and 7E. In the embodiment of FIG. 4, register 306A may be understood to represent AC97 register 7C, and register 306B may be understood to represent AC97 register 7E.

According to the present invention, registers 7C and 7E are programmable, such that vendor ID information provided at least in part from an off-chip source may be loaded into the registers 306A and 306B. In contrast, conventional AC97 devices have hard-wired or fixed vendor ID information that is supplied to the registers 7C and 7E. In addition, according to the present invention, additional registers 308A and 308B are provided. If desired, they may be given designations with the AC97 scheme, such as 76 and 78. The purpose of additional registers 308A and 308B is to provide additional space for receiving and storing vendor ID information. More particularly, these registers 308A and 308B may be utilized in conjunction with registers 306A and 306B to provide information for multiple vendors. For example, registers 306A and 306B may be utilized to store vendor information for a company that manufactured the basic AC97 device, such as DAA circuitry as depicted in FIG. 1. Registers 308A and 308B may then be utilized to store vendor information for a company that provides additional software features for the AC97 device, or that provides a hardware system configuration utilizing the AC97 device as a subset. It is again noted that the number of registers and how they are utilized may be modified, as desired, without departing from on-chip programmable vendor ID circuitry, according to the present invention.

In operation of the embodiment 400 shown in FIG. 4, the two sources of vendor ID information 302 and 310 provide information as to a primary vendor (e.g., the hardware manufacturer) and a secondary vendor (e.g., the software enhancements supplier). In the embodiment shown, registers 308A and 308B are always loaded with secondary ID information from source 310. Registers 306A and 306B may be loaded either from source 302 or from source 310, depending upon the state of REMAP signal 416 that controls the MUX 412 and the MUX 414. As contemplated in the embodiment, the REMAP signal 416 is asserted to select the secondary ID information source 310 if it is desired to remap the primary ID registers 306A and 306B to hold the secondary ID information. The default condition is expected to be for the primary ID registers 306A and 306B to be loaded with the primary ID information from source 302. This REMAP feature helps to provide compatibility with legacy systems that only have functionality to read information from a limited number of registers, such as the two vendor ID registers 7C and 7E in the AC97 specification. It is again noted that the number of sources and how they are utilized may be selected as desired to load on-chip programmable vendor ID circuitry 130, according to the present invention.

FIG. 5 is a block diagram of an embodiment 500 utilizing programmable circuitry, such as an EEPROM 220, to provide vendor identification information from an off-chip source, according to the present information. The dotted line represents the integrated circuit boundary for an integrated circuit portion of host-side DAA circuitry 104 from FIG. 1. The integrated circuit for DAA circuitry 104 includes an AC97 digital interface 530, EEPROM state machine 130A, vendor ID circuitry 130B, and fixed ID information source 510. External to the integrated circuit are the EEPROM 220 and an AC97 digital controller 102B.

The pins connecting the EEPROM 220 and the EEPROM state machine 130A include the DATA pin 518, through which data, such as vendor ID information or control information, may be written to or read from the EEPROM 220. The pins also include a CLK pin 520 through which the integrated circuit 104 may control input and output timing for the EEPROM 220. These pins may also double as general purpose input/output (GPIO) pins on the integrated circuit. Thus, if other devices desire to utilize the pins for other purposes, they may do so. In particular, the pins may be utilized after the vendor ID information has been loaded into the on-chip programmable vendor ID circuitry 130B. If this is to be done, connections 522 and 524 may be utilized to take advantage of the pins 518 and 520. In addition, once on-chip, the connections 526 and 528 may be utilized to communicate this other device information to the rest of the integrated circuit 104.

In addition, it is contemplated that the external programmable circuitry 220 may be programmed through the integrated circuit 104. For example, the connections 526 and 528 may be connected to the AC97 digital interface 530, as shown in FIG. 5, so that the EEPROM 220 may be programmed through the AC97 digital interface 530. More specifically, the external AC97 digital controller 102B may configure the programmable circuitry 220 through the AC97 digital interface 530. It is also noted that other circuitry could be provided, as desired, to provide for programming of the programmable circuitry 220 through the connections 526 and 528.

The pins connecting the digital controller 102B to the digital interface 530 include a reset (RESET_) pin 532, a bit clock (BCLK) pin 534, a synchronization (SYNC) pin 536, a serial data output (SDO) pin 538, and a serial data input (SDI) pin 540. In the AC97 specification environment, the RESET_pin 532 is an active low input signal to the circuitry 104 that is used to reset all control registers to a defined, initialized state. The BCLK pin 534 is a serial port bit clock input/output signal that controls serial data input signals and serial data output signals. The BCLK pin 534 is an input to the circuitry 104 if the circuitry 104 is configured as a primary AC97 device, and is an output to the circuitry 104 if the circuitry 104 is configured as a secondary AC97 device. The SYNC pin 536 is an input signal to the circuitry 104 that is a data framing signal that is used to indicate the start and stop of a communication data frame. The SDO pin 538 provides serial communication and control data generated by the digital controller 102B and presented as an input to the circuitry 104. The SDI pin 540 provides serial communication and status data generated as an output signal by the circuitry 104.

The digital interface 530 includes internal interface 542 through which digital interface 530 communicates with other chip circuitry. The digital interface 530 also has a reset signal (RESET) 508 and a initialize signal (INIT) 506 that are provided to the EEPROM state machine 130A, which in turn provides information to the vendor ID circuitry 130B along interface 516. Fixed vendor ID information from source 510 may also be provided directly to the vendor ID circuitry 130B along interface 512, or first to the EEPROM state machine 103A through interface 514. It is noted that the suffix designation "_" for the RESET_pin 532 represents a signal that is active at a low logic level. It is further noted that the active low or active high status of any given signal may be modified as desired depending upon design considerations.

By utilizing an external EEPROM configuration as depicted in FIG. 5, cost is reduced over including EEPROM-type circuitry on the integrated circuit portion of the host-side DAA circuitry 104. An EEPROM process is more expensive than a CMOS process, which is utilized to manufacture the integrated circuitry within the host-side DAA circuitry 104. The solution of FIG. 5, therefore, makes use of an inexpensive and small external EEPROM coupled to CMOS DAA circuitry with a serial interface to download identification data upon reset of the system or upon a command. The serial interface may be, for example, a 2-pin I$^2$C-compatible interface. Example EEPROMs that may be used include an AT24C01 2-Wire Serial EEPROM available from Atmel Corporation.

In operation of the embodiment of FIG. 5, assuming that the vendor ID registers within the vendor ID circuitry 103B are four 2-byte registers as discussed with respect to FIG. 4, the EEPROM communication sequence may include reading 5 bytes from the EEPROM 220. This may occur immediately after a cold reset, or also upon a software command, and the entire latency for completing this task may be about 2 ms. The following process steps are an example:

1. Initialization—Initialization synchronizes the EEPROM 220 and the EEPROM state machine 130A. The initialization step may be started through the RESET signal 508, which is typically applied at power-up or reboot, or started through the INIT signal 506, which is typically applied by software command.
2. Access Header Byte—After initialization, a first header byte is read from the EEPROM 220. This header byte may be, for example, one of two expected patterns. The header byte may identify whether the primary registers 306A and 306B should be remapped to the secondary ID information within the EEPROM 220, or should be loaded with the default primary ID information 302.
3. Access Bytes 2 and 3—The next two bytes read from the EEPROM 220 are utilized to load the secondary register 308A with 16-bits of information. (If the header byte indicates that a remap should occur, the primary register 306A is loaded with the same information as the secondary register 308A.)
4. Access Bytes 4 and 5—The final two bytes read from the EEPROM 220 are utilized to load the secondary register 308B with 16-bits of information. (If the header byte indicates that a remap should occur, the primary register 306B is loaded with the same information as the secondary register 308B.)
5. End Process—Once the five bytes of information are read from the EEPROM 220, the vendor ID load procedure is completed.

Subsequently, the information stored in the vendor ID circuitry 308B may be output or reported through output 422.

It is noted that during each of the process cycle steps identified above, the EEPROM state machine 130A analyzes whether there are any contentions on the pins 518 and 520. The EEPROM state machine will interpret as a contention any signal on the pins 518 and 520 that is detected as having a logic level opposite of how the EEPROM state machine is trying to drive the pins. In addition, the EEPROM state machine 130A confirms that the responses, such as the header information and acknowledge information, it is receiving from the EEPROM match expected responses. If not, the vendor ID load process may be stopped. The EEPROM state machine 130A, therefore, has error checking mechanisms to help make sure that it does not respond to signals on pins 518 and 520 that were not intended for the EEPROM state machine 130A. This situation could occur, for example, if another device, such as an audio amplifier, is utilizing one of the pins 518 and 520 through external connections 522 and 524.

It is further noted that the process steps set forth above may be modified, as desired, depending upon the external device used to provide vendor ID information to the on-chip programmable vendor ID circuitry. For example, if a EEPROM is utilized as depicted in FIG. 5, the process steps may change depending upon the particular EEPROM utilized. In addition, each EEPROM may have its own set of interface requirements and control signals. Thus, the examples provided in this description should be taken as examples and not as limiting the present invention.

Further modifications and alternative embodiments of this invention will be apparent to those skilled in the art in view of this description. Accordingly, this description is: to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

We claim:
1. A direct access arrangement (DAA) device, comprising:
   a digital interface within an integrated circuit configured to communicate with an external host processor; and
   programmable circuitry within the integrated circuit and coupled to the digital interface, the programmable circuitry being configured to receive and store vendor identification information based at least in part upon one or more signals from a source external to the integrated circuit, wherein the vendor identification information relates to device reporting information for the integrated circuit.

2. The DAA device of claim 1, wherein the digital interface is configured to operate within AC97 operational specifications.

3. The DAA device of claim 2, wherein the programmable circuitry comprises multiple registers, each capable of storing vendor identification information.

4. The DAA device of claim 3, wherein the multiple registers comprise a first register and a second register that each store first vendor identification information and a third register and a fourth register that each store second vendor identification information.

5. The DAA device of claim 4, wherein the first, second, third and fourth registers are 16-bit registers.

6. The DAA device of claim 4, wherein the first and third registers may be loaded with the same vendor identification information and the second and fourth registers may be loaded with the same vendor identification information.

7. The DAA device of claim 1, wherein the external source for the identification information is programmable circuitry.

8. The DAA device of claim 7, wherein the external programmable circuitry may be loaded with vendor identification information through the digital interface.

9. The DAA device of claim 7, wherein the external programmable circuitry is electrically programmable.

10. The DAA device of claim 9, wherein the external programmable circuitry is an EEPROM.

11. The DAA device of claim 1, wherein the programmable circuitry comprises a look-up table with selectable sets of vendor identification information and wherein the external source provides vendor identification information through a control signal coupled to the look-up table that selects a set of vendor identification information.

12. An integrated circuit device configured to operate within AC97 operational specifications, comprising:
    a digital interface within an integrated circuit configured to operate within AC97 operational specifications; and
    programmable circuitry coupled to the digital interface, the programmable circuitry being configured to receive and store vendor identification information based at least in part upon one or more signals from a source external to the integrated circuit, wherein the vendor identification information relates to device reporting information for the integrated circuit.

13. The integrated-circuit device of claim 12, wherein the programmable circuitry comprises multiple registers, each capable of storing vendor identification information.

14. The integrated circuit device of claim 12, wherein the external source for the identification information is programmable circuitry.

15. The integrated circuit device of claim 14, wherein the external programmable circuitry is a EEPROM.

16. The integrated circuit device of claim 12, wherein the programmable circuitry receives fixed vendor identification information from a source internal to the integrated circuit and programmable vendor identification information from a source external to the integrated circuit.

17. A computer system having direct-access-arrangement (DAA) circuitry configured to couple the computer system to telephone lines, comprising:
    a processor;
    a digital controller coupled to the processor and configured to operate within AC97 operational specifications;
    digital-access-arrangement (DAA) circuitry including at least one integrated circuit, the DAA circuitry being coupled to the digital controller and configured to operate within AC97 operational specifications; and
    programmable circuitry included within the integrated circuit, the programmable circuitry being configured to receive and store vendor identification information based at least in part upon one or more signals from a source external to the integrated circuit, wherein the vendor identification information relates to device reporting information for the integrated circuit.

18. The computer system of claim 17, wherein the programmable circuitry comprises multiple registers, each capable of storing vendor identification information.

19. The computer system of claim 18, wherein the multiple registers comprise a first register and a second register that each store first vendor identification information and a third register and a fourth register that each store second vendor identification information.

20. The computer system of claim 17, wherein the external source for the identification information is programmable circuitry.

21. The computer system of claim 20, wherein the external programmable circuitry is a EEPROM.

22. The computer system of claim 21, wherein a interface between the EEPROM and the integrated circuit is a 2-pin interface.

23. The computer system of claim 22, wherein the 2-pin interface may also be used by other devices coupled to the integrated circuit.

24. The computer system of claim 22, wherein the 2-pin interface is utilized by the DAA circuitry to program the EEPROM.

25. A computer system including circuitry configured to operate within AC97 operational specifications, comprising:
    a processor;
    a digital controller coupled to the processor and configured to operate within AC97 operational specifications;
    an integrated circuit device configured to operate within AC97 operation specifications, the integrated circuit device being coupled to the digital controller; and
    programmable circuitry included within the integrated circuit device, the programmable circuitry being configured to receive and store vendor identification information based at least in part upon one or more signals from a source external to the integrated circuit, wherein the vendor identification information relates to device reporting information for the integrated circuit device.

26. The integrated circuit device of claim 25, wherein the programmable circuitry comprises multiple registers, each capable of storing vendor identification information.

27. The integrated circuit device of claim 25, wherein the external source for the identification information is programmable circuitry.

28. The integrated circuit device of claim 27, wherein the external programmable circuitry is a EEPROM.

29. The integrated circuit device of claim 27, wherein the programmable circuitry receives fixed vendor identification information from a source internal to the integrated circuit and programmable vendor identification information from a source external to the integrated circuit.

30. A method for providing vendor identification information for direct-access-arrangement (DAA) circuitry, comprising:
    providing a DAA integrated circuit configured to communicate with a host processor;
    receiving vendor identification information within the DAA integrated circuit based at least in part upon one or more signals from a source external to the integrated circuit; and storing the vendor identification information in programmable circuitry within the DAA integrated circuit, wherein the vendor identification relates to device reporting information for the DAA integrated circuit.

31. The method of claim 30, wherein the DAA integrated circuit is configured to operate within AC97 operational specifications.

32. The method of claim 30, wherein the receiving step comprises receiving programmable identification information from external programmable circuitry.

33. The method of claim 30, wherein the storing step comprises storing first vendor identification information in at least one first register and storing second vendor identification information in at least one second register.

34. The method of claim 33, wherein the receiving step comprises receiving fixed vendor identification information from a source internal to the integrated circuit and receiving programmable vendor identification information from a source external to the integrated circuit.

35. The method of claim 30, wherein the vendor identification information is received and stored upon power-up of the integrated circuit.

36. The method of claim 30, wherein the vendor identification information received and stored upon receipt of a software command.

37. A method for providing vendor identification information for an integrated circuit device configured to operate within AC97 operational specifications, comprising:

providing an integrated circuit device configured to operate within AC97 operational specifications;

receiving vendor identification information within the integrated circuit device based at least in part upon one or more signals from a source external to the integrated circuit; and storing the vendor identification information in programmable circuitry within the integrated circuit device, wherein the vendor identification information relates to device reporting information for the integrated circuit device.

38. The method of claim 37, wherein the receiving step comprises receiving programmable identification information from external programmable circuitry.

39. The method of claim 38, wherein the external programmable circuitry is an EEPROM.

40. The method of claim 39, further comprising utilizing with another device an interface between the EEPROM and the integrated circuit after the receiving and storing steps.

41. The method of claim 37, wherein the storing step comprises storing first vendor identification information in at least one first register and storing second vendor identification information in at least one second register.

42. The method of claim 37, wherein the receiving step comprises receiving fixed vendor identification information from a source internal to the integrated circuit and receiving programmable vendor identification information from a source external to the integrated circuit.

* * * * *